US010661689B2

(12) United States Patent
Ponich

(10) Patent No.: US 10,661,689 B2
(45) Date of Patent: May 26, 2020

(54) ATTACHABLE/DETACHABLE LAP BLANKETS FOR SEAT OCCUPANTS

(71) Applicant: Katya Ponich, Calgary (CA)

(72) Inventor: Katya Ponich, Calgary (CA)

( * ) Notice: Subject to any disclaimer, the term of this patent is extended or adjusted under 35 U.S.C. 154(b) by 0 days.

(21) Appl. No.: 16/157,647

(22) Filed: Oct. 11, 2018

(65) Prior Publication Data

US 2019/0160988 A1 May 30, 2019

(30) Foreign Application Priority Data

Nov. 27, 2017 (CA) .................................... 2986722

(51) Int. Cl.
| | |
|---|---|
| *B60N 2/58* | (2006.01) |
| *B60N 2/60* | (2006.01) |
| *A47G 9/04* | (2006.01) |
| *A47G 9/02* | (2006.01) |
| *B60N 2/38* | (2006.01) |
| *A47G 9/06* | (2006.01) |

(52) U.S. Cl.
CPC ......... *B60N 2/6009* (2013.01); *A47G 9/0223* (2013.01); *A47G 9/04* (2013.01); *B60N 2/38* (2013.01); *A47G 9/066* (2013.01)

(58) Field of Classification Search
CPC ...... B60N 2/6009; B60N 2/38; A47G 9/0223; A47G 9/04; A47G 9/066
USPC .............................................. 297/219.1–229
See application file for complete search history.

(56) References Cited

U.S. PATENT DOCUMENTS

| | | | | | |
|---|---|---|---|---|---|
| 1,384,908 | A | * | 7/1921 | Lockwood | B60N 2/6027 297/228.13 |
| 1,519,741 | A | * | 12/1924 | Schickerling | B60N 2/6009 296/81 |
| 1,962,215 | A | * | 6/1934 | Sallop | B60N 2/5816 297/228.11 X |
| 2,601,488 | A | * | 6/1952 | Allen | B60N 2/345 5/94 |
| 2,638,378 | A | * | 5/1953 | Molinaro | B60J 11/00 296/136.03 |
| 2,688,998 | A | * | 9/1954 | Erickson | B60N 2/6009 297/219.1 |
| 2,980,169 | A | * | 4/1961 | Campbell | B60N 2/6009 297/228.12 |
| 3,199,916 | A | * | 8/1965 | Chiarenza | B60N 2/6027 297/229 X |
| 4,118,066 | A | * | 10/1978 | Ricke | B60J 11/025 297/184.11 X |
| 4,134,616 | A | * | 1/1979 | Christensen | B60N 2/60 297/229 X |
| 4,458,738 | A | * | 7/1984 | Wilson | B60J 1/2011 297/229 X |

(Continued)

FOREIGN PATENT DOCUMENTS

| | | | | |
|---|---|---|---|---|
| DE | 19516846 | A1 * | 11/1996 | ........... B60N 2/6009 |
| GB | 2532113 | A * | 5/2016 | ............. A47C 31/10 |

*Primary Examiner* — Rodney B White
(74) *Attorney, Agent, or Firm* — Kyle R Satterthwaite; Ryan W Dupuis; Ade & Company Inc.

(57) ABSTRACT

Seats and seat covers are provided with selectively attachable and detachable blankets for lap warming of seat occupants. Embodiments include golf cart attachable blanket systems, and portable seating and blanket systems operable configurable between multi-occupant and individual single-occupant modes of use, and/or between compact transport and working multi-occupant positions.

20 Claims, 5 Drawing Sheets

(56) References Cited

U.S. PATENT DOCUMENTS

| | | | | |
|---|---|---|---|---|
| 4,487,451 | A * | 12/1984 | Fiorini | B60N 2/34 297/219.1 |
| 4,514,870 | A * | 5/1985 | Tyler, Jr. | A47G 9/066 2/69 |
| 4,659,144 | A * | 4/1987 | Reese | B60N 2/6009 297/184.11 X |
| 4,723,814 | A * | 2/1988 | Hunt | B60N 2/6027 297/219.1 |
| 4,872,724 | A * | 10/1989 | Deley | A47C 31/023 297/218.4 |
| 4,924,814 | A * | 5/1990 | Beaudet | A01K 1/0272 119/712 |
| 4,943,105 | A * | 7/1990 | Kacar | A01K 1/0272 297/229 X |
| 5,007,676 | A * | 4/1991 | Lien | B60N 2/5833 297/228.13 X |
| 5,114,204 | A * | 5/1992 | Bernardo | B60N 2/6009 297/184.11 X |
| 5,188,421 | A * | 2/1993 | Arseneault | B60N 2/28 297/182 |
| 5,294,166 | A * | 3/1994 | Shapland | B60N 2/6009 297/229 X |
| 5,302,001 | A * | 4/1994 | van Dis | A47C 31/11 297/228.13 |
| 5,338,092 | A * | 8/1994 | Wiltsey | A47C 31/11 297/228.13 X |
| 5,560,677 | A * | 10/1996 | Cykana | B60N 2/5825 297/218.3 |
| 5,560,683 | A * | 10/1996 | Penley | A47C 31/11 297/228.13 X |
| 5,716,096 | A * | 2/1998 | Pryde | B60N 2/609 297/228.1 |
| 5,768,758 | A * | 6/1998 | Deignan | A47C 31/02 297/228.11 X |
| 5,931,538 | A * | 8/1999 | Cayet | B60N 2/58 297/229 X |
| 5,950,261 | A * | 9/1999 | Hay | A41B 13/06 2/69 |
| 6,145,932 | A * | 11/2000 | Hamel-Nyhus | A47D 15/006 297/219.12 |
| 6,309,017 | B1 * | 10/2001 | Middleton | A47C 31/113 297/228.13 X |
| 6,327,726 | B1 * | 12/2001 | Weber | A47D 5/006 297/219.1 X |
| 6,382,720 | B1 * | 5/2002 | Franklin | B60N 2/6027 297/228.13 X |
| 6,393,638 | B1 * | 5/2002 | MacColl | A45F 4/02 383/4 |
| 6,484,333 | B1 * | 11/2002 | Hill | A47G 9/066 2/49.4 |
| 6,543,843 | B1 * | 4/2003 | Moilanen | B60N 2/5825 297/218.3 |
| 6,726,277 | B1 * | 4/2004 | Samaha | A47C 7/66 297/219.1 X |
| 6,764,134 | B1 * | 7/2004 | Crescenzi | A47C 31/00 297/219.1 X |
| 7,210,738 | B1 * | 5/2007 | Mahaffy | B60N 2/60 297/219.1 X |
| 7,261,375 | B2 * | 8/2007 | Godshaw | A01K 1/0272 297/219.1 X |
| 7,287,813 | B2 * | 10/2007 | Aliev | B60R 11/00 297/219.1 X |
| 7,488,036 | B2 * | 2/2009 | Tache | A47C 31/00 297/228.13 X |
| 7,530,635 | B2 * | 5/2009 | Schramek-Flye | A47D 1/103 297/228.12 X |
| 7,628,438 | B2 * | 12/2009 | Partch | B60N 2/305 296/24.46 |
| 7,677,662 | B2 * | 3/2010 | Thompson | A47C 31/11 297/228.13 X |
| 7,703,149 | B2 * | 4/2010 | Ward, Jr. | A41D 13/04 2/48 |
| 7,779,492 | B2 * | 8/2010 | Mangano | A47C 7/383 5/417 |
| 7,921,469 | B2 * | 4/2011 | Ward, Jr. | A41D 13/04 2/48 |
| 8,042,870 | B2 * | 10/2011 | Cortellazzi | B60N 2/6054 297/219.1 |
| 9,610,877 | B2 * | 4/2017 | Umlauf | B60N 2/90 |
| 9,669,742 | B1 * | 6/2017 | Bailey | B60N 2/5816 |
| 9,809,140 | B2 * | 11/2017 | Saunders | B60N 3/008 |
| 9,845,033 | B1 * | 12/2017 | Umlauf | B60N 2/6018 |
| 9,963,086 | B2 * | 5/2018 | Umlauf | B60N 2/90 |
| 10,343,568 | B2 * | 7/2019 | Umlauf | B60N 2/6009 |
| 10,363,847 | B2 * | 7/2019 | Umlauf | B60N 2/6018 |
| 10,406,951 | B2 * | 9/2019 | Leon Guerrero | B60N 2/6009 |
| 2005/0236874 | A1 * | 10/2005 | Godshaw | A01K 1/0272 297/35 |
| 2008/0179926 | A1 * | 7/2008 | Kushner | A47C 31/11 297/220 |
| 2012/0098308 | A1 * | 4/2012 | Aliev | B60N 2/6018 297/219.1 |
| 2015/0069804 | A1 * | 3/2015 | Long | B60N 2/6036 297/228.13 |
| 2016/0288679 | A1 * | 10/2016 | White | B60N 2/6009 |

* cited by examiner

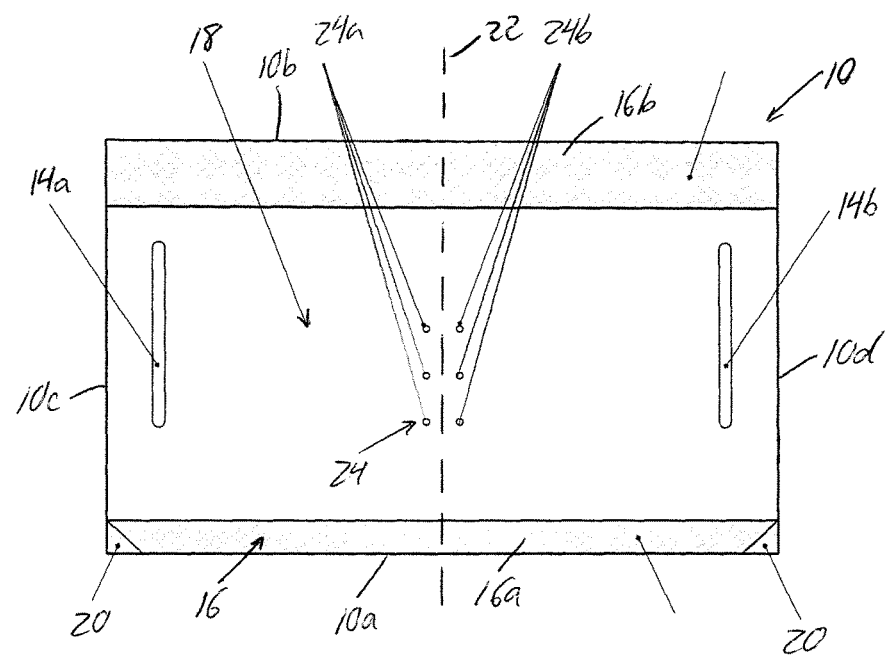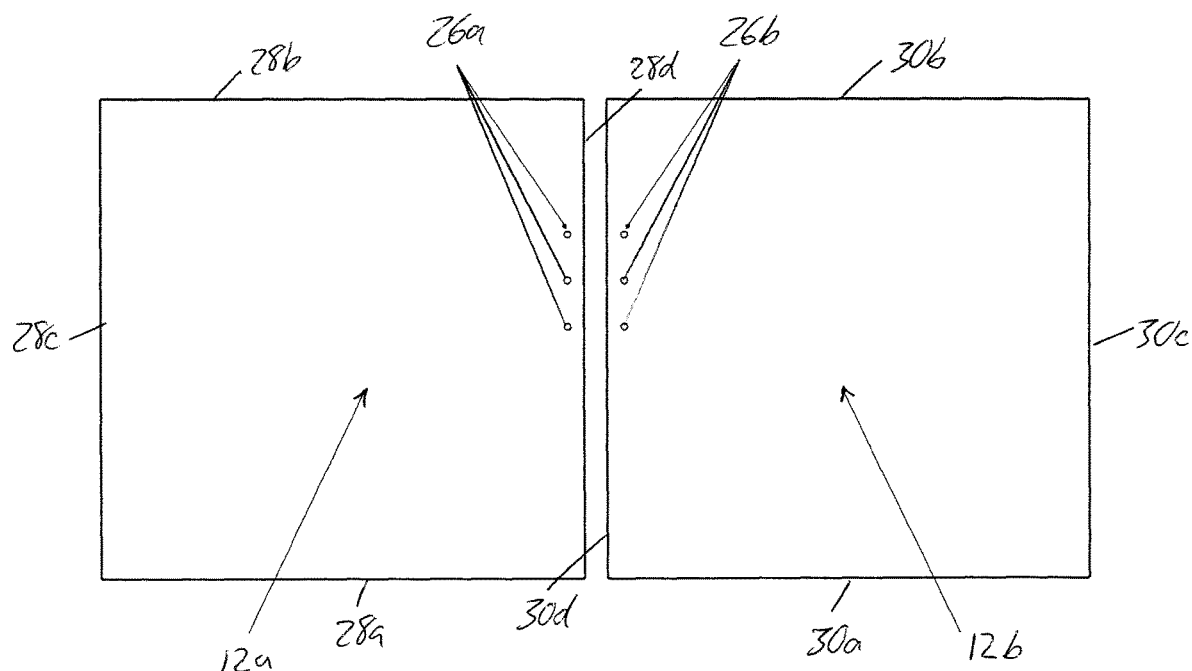
FIG. 1

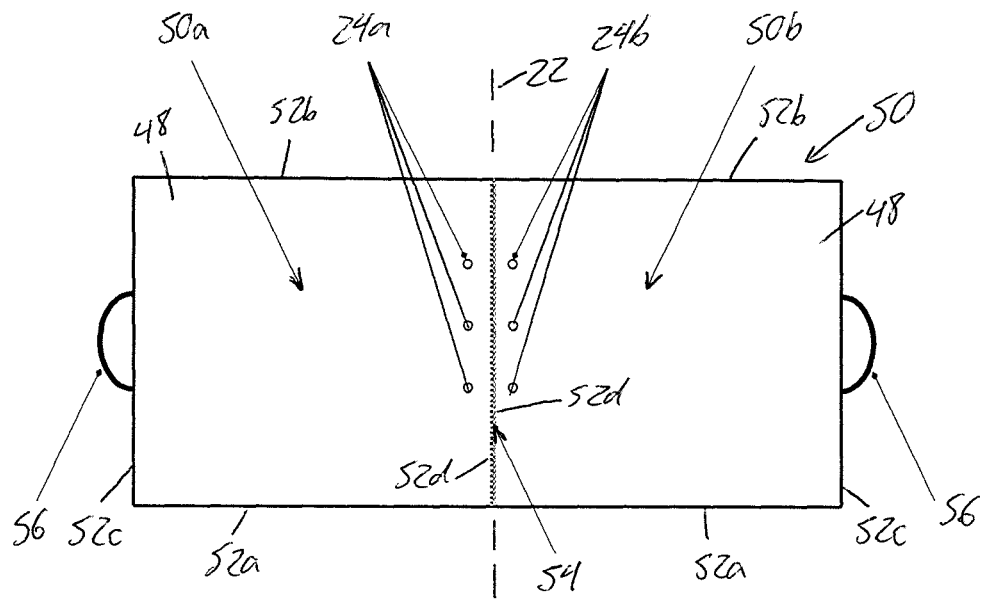
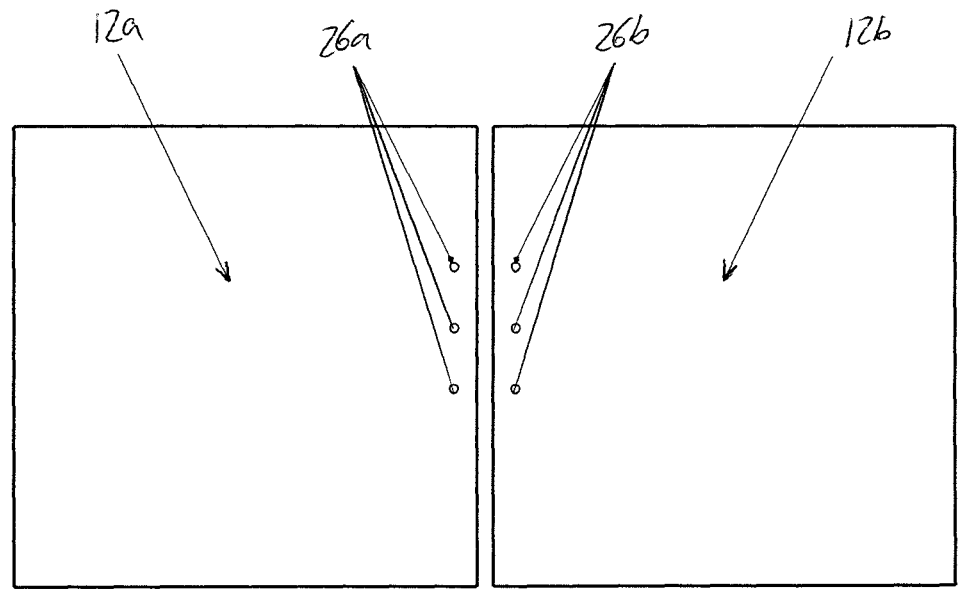
FIG. 5

ATTACHABLE/DETACHABLE LAP BLANKETS FOR SEAT OCCUPANTS

CROSS-REFERENCE TO RELATED APPLICATIONS

This application claims benefit under 35 U.S.C. 119(a) of Canadian Patent Application No. 2,986,722, filed Nov. 27, 2017, the entirety of which is incorporated herein by reference.

FIELD OF THE INVENTION

The present invention relates generally to seating, and more particularly to attachable/detachable seating accessories for increasing the comfort of seat occupants.

BACKGROUND

It is known to use blankets during seated participation in outdoor activities to improve the comfort of a participant. For example, golf cart seat blankets are known that have slots for fitting over the armrests of a golf cart that resides at opposite ends of a multi-occupant bench-style seat of the golf cart. However, getting under the blanket requires that the user lift up the blanket from around the arm, making it inconvenient to repeatedly get in and out from under the blanket during play of game. Use of a standard blanket brought from home at various outdoor events is also problematic, as the generic blanket is not secured in any way to the seat, meaning that the blanket can easily fall to the floor and become soiled or lost, or even blow away if left momentarily unattended in a windy outdoor environment.

Accordingly, there remains room for improvement in the field of blanket-aided seating comfort.

SUMMARY OF THE INVENTION

According to one aspect of the invention there is provided a lap blanket system comprising:
a first set of one or more fastener elements supported or supportable on a seat; and
a blanket having a second set of one or more fastener elements thereon, said second set of one or more fastener elements being selectively matable with at least one of said first set of one or more fastener elements, whereby said second set of one or more fastener elements is operable to secure said blanket to said seat through the first set of one or more fastener elements.

According to a second aspect of the invention, there is provided a lap warming method using the forgoing system, said method comprising selectively switching the seat between a lap-warming configuration with the blanket fastened to the seat and a non-warming configuration with the blanket detached from said seat according to warming needs of a current or intended seat occupant.

According to a third aspect of the invention, there is provided a lap warming method comprising selectively switching at least one occupant area of a multi-occupant seat between a lap-warming configuration and a non-warming configuration by selectively attaching or detaching a respective one of two blankets to said occupant area of the multi-occupant seat according to the needs of a current or intended occupant of said occupant area.

BRIEF DESCRIPTION OF THE DRAWINGS

Preferred embodiments of the invention will now be described in conjunction with the accompanying drawings in which:

FIG. 1 is a plan view of a golf cart blanket system according to one embodiment of the present invention, which features a seat cover and two attachable/detachable lap blankets.

FIG. 5 is a plan view of a portable seat and blanket system according to another embodiment of the present invention.

In the drawings like characters of reference indicate corresponding parts in the different figures.

DETAILED DESCRIPTION

Figure 2:
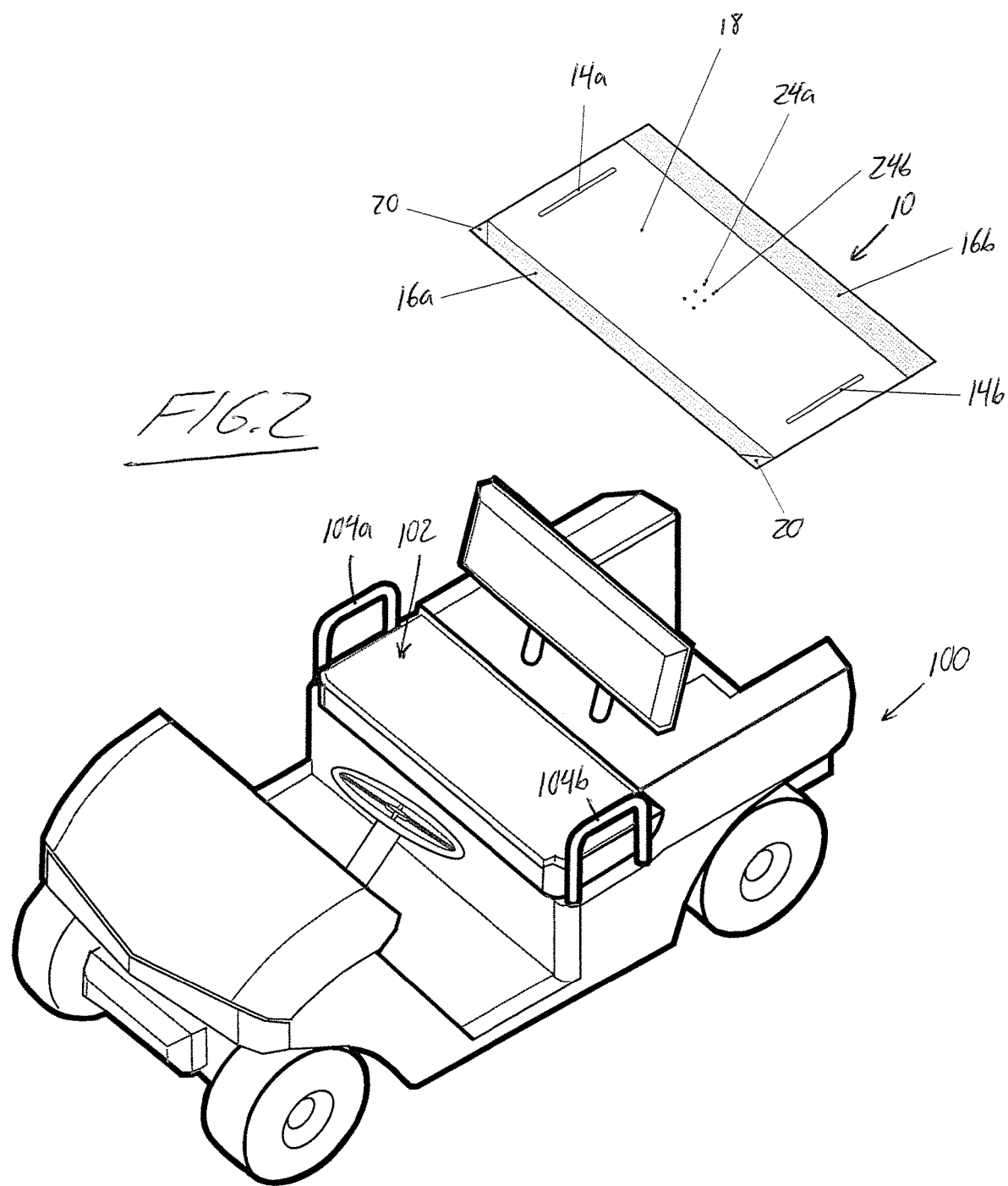
FIG. 2 is an exploded perspective view illustrating placement of the seat cover of FIG. 1 on a golf cart.

FIG. 1 illustrates a three-piece golf cart blanket system whose three constituent pieces consist of a seat cover 10 and two lap blankets 12a, 12b. The seat cover 10 is a fabric panel of sufficient area to fully cover a two-person seat 102 of a conventional golf cart 100. In the illustrated embodiment, the seat cover has a rectangular shape of greater length in one direction than the other. The longer of the seat cover's two dimensions is referred to herein as its width dimension, while the shorter of the seat cover's two dimensions is referred to herein as its depth dimension, as the longer width dimension of the seat cover's elongated shape lies spans the notable lateral width of the golf cart seat 102 when the seat cover is installed, while the shorter depth dimension of the seat cover spans the smaller front-to-rear depth of the golf cart seat 102. With this installed orientation in mind, the four-sided perimeter of the seat cover features elongated front and rear edges 10a, 10b that lie parallel and opposite to one another across the depth dimension of the cover when t laid out flat, and two shorter ends 10c, 10d that lie parallel and opposite to one another across the width dimension of the seat cover.

A short distance inward from each end 10c, 10d, the seat cover optionally features a respective slot-shaped opening 14a, 14b that runs parallel to the respective end 10c, 10d thereof to fit over a respective handle 104a, 104b of the golf cart 100 that stands upright at a respective end of the golf cart seat 102. In the illustrated embodiment, the seat cover has a multi-layer construction, with a bottom substrate layer 16 of nylon or other fabric and an insulating top layer 18 of fleece, wool or other material of greater thermal insulative value than the substrate fabric. In the illustrated example, the insulating top layer 18 is slightly smaller than the bottom substrate layer 16 in the depth direction of the seat cover, yet spans a substantial majority of this depth dimension, leaving only a relatively narrow strip 16a, 16b of the bottom substrate layer exposed along the front and rear edges 10a, 10b of the seat cover. These front and rear strips 16a, 16b of the seat cover 10 form overhanging portions thereof that overhang the front and rear edges of the golf cart seat 102 when the seat cover is installed thereon. Meanwhile, the insulating top layer 18 spans the entire topside of the golf cart seat 102 to provide a notable layer of thermal insulation thereon. In other embodiments, the insulating top layer 18 may span the entirety of the seat cover.

As shown in the drawings, folded-over pockets may be provided at each end of the front overhanging strip 16a of the seat cover to incorporate weights therein, thus providing weighted elements 20 at the front of the seat cover that help hold the seat cover down over the front edge of the golf cart seat 102. Such weights are not limited to placement at the front corners of the seat cover, as weights may additionallh or alternatively be incorporated elsewhere along the cover's front edge 10a, for example inside a folded-over hem at the front edge 10a. It will also be appreciated that weights may be attached to the cover by means other than a hem or other folded-over enclosure. In the installed position of the seat cover 10, the rear strip 16b of the seat cover is preferably tucked behind or under the golf cart seat 102 at the rear edge thereof to also help hold the seat cover in place and resist lifting thereof by blowing winds.

The two blankets 12a, 12b are defined by respective fabric panels of equal size, which may be of single-layer or multi-layer construction and preferably include a thermally insulative material, for example the same fleece, wool or other insulative material used in the insulating top layer 18 of the seat cover 10. A depth dimension of each blanket is measured in the same direction as the depth dimension of the seat cover, but exceeds this depth dimension of the seat cover. A width dimension of each blanket is measured in the same direction as the width dimension of the seat cover, and may be equal to or longer than the blanket's depth dimension. The width of each blanket is at least equal to, and preferably exceeds, half of the seat cover's width dimension, as each blanket 12a, 12b is intended to cover a respective half of the seat cover 10, thereby providing a respective lap blanket for each occupant of a two-occupant bench-style golf cart seat 102.

An imaginary mid-plane 22 lies parallel to the ends 10c, 10d of the seat cover 10 at a central location therebetween to denote a widthwise center of the seat cover. This mid-plane 22 thus bisects the cover into two equally sized halves, which are of symmetrically mirrored relation to one another across this mid-plane 22. A first set of fastener elements 24 is mounted to the insulating top layer 18 at the topside of the seat cover, and features a first subset of fastener elements 24a situated in close but spaced relation to the mid-plane 22 on a first side thereof, and a matching second subset of fastener elements 24b situated oppositely and symmetrically of the first subset in close but spaced relation to the mid-plane 22 on the opposing second side thereof. Each subset of fastener elements 24a, 24b thus resides on a respective half of the seat cover 10. Each subset 24a, 24b features a row of fastener elements laid out parallel to the mid-plane 22 in slightly spaced relation from one another in the depth direction of the seat cover.

First blanket 12a features a second set of fastener elements 26a thereon that are laid out on the underside thereof in matching pattern and quantity to the first subset 24a of fastener elements on the topside of the seat cover 10. The second set of fastener elements 26a are thus laid out in a linear row whose spacing is equal to that found in the first subset 24a of fastener elements on the seat cover 10. The rectangular perimeter of the first blanket 12a features a front edge 28a, an opposing and parallel rear edge 28b, an outer edge 28c and an opposing and parallel inner edge 28d. The row of second fastener elements 26a on the first blanket 12a lies near and parallel to the inner edge 28d, at a distance therefrom equal to the distance measured from the mid-plane 22 of the seat cover 10 to the seat cover's first subset 24a of fastener elements. The second set of fastener elements 26a on the first blanket are of a corresponding and matable type to the first subset 24a of fastener elements on the seat cover 10, whereby the first blanket 12a is selectively attachable to the seat cover 10 by mating of the first blanket's fastener elements 26a with the seat cover's first subset of fastener elements 24a.

The second blanket 12b is of symmetrically mirrored relation to the first blanket. Second blanket 12b features a third set of fastener elements 26b therein that is laid out on the underside thereof in matching pattern and quantity to the second subset 24b of fastener elements on the topside of the seat cover. The third set of fastener elements 26b are thus laid out in a linear row whose spacing is equal to that found in the second subset 24b of fastener elements on the seat cover 10. The rectangular perimeter of the second blanket 12b features a front edge 30a, an opposing and parallel rear edge 30b, an outer edge 30c and an opposing and parallel inner edge 30d. The row of second fastener elements 26b on the second blanket 12b lies near and parallel to the inner edge 30d at a distance therefrom that is equal to the distance measured from the mid-plane 22 of the seat cover 10 to the seat cover's second subset 24b of fastener elements. The third set of fastener elements 26b on the second blanket are of a corresponding and matable type to the second subset 24b of fastener elements on the seat cover 10, whereby the second blanket 12b is selectively attachable to the seat cover 10 by mating of the second blanket's fastener elements 26b with the seat cover's second subset of fastener elements 24b.

The schematically illustrated fastener elements in the illustrated embodiment are male and female snap fasteners, for example male snap fastener elements 24a, 24b on the topside of the seat cover 10 and mating female snap fastener elements 26a, 26b on the underside of the blankets 12a, 12b. However, the distribution of male or female elements among the seat cover and blankets may be reversed, or other fastener types, e.g. hook and loop fastener elements, may be employed.

Figure 3:
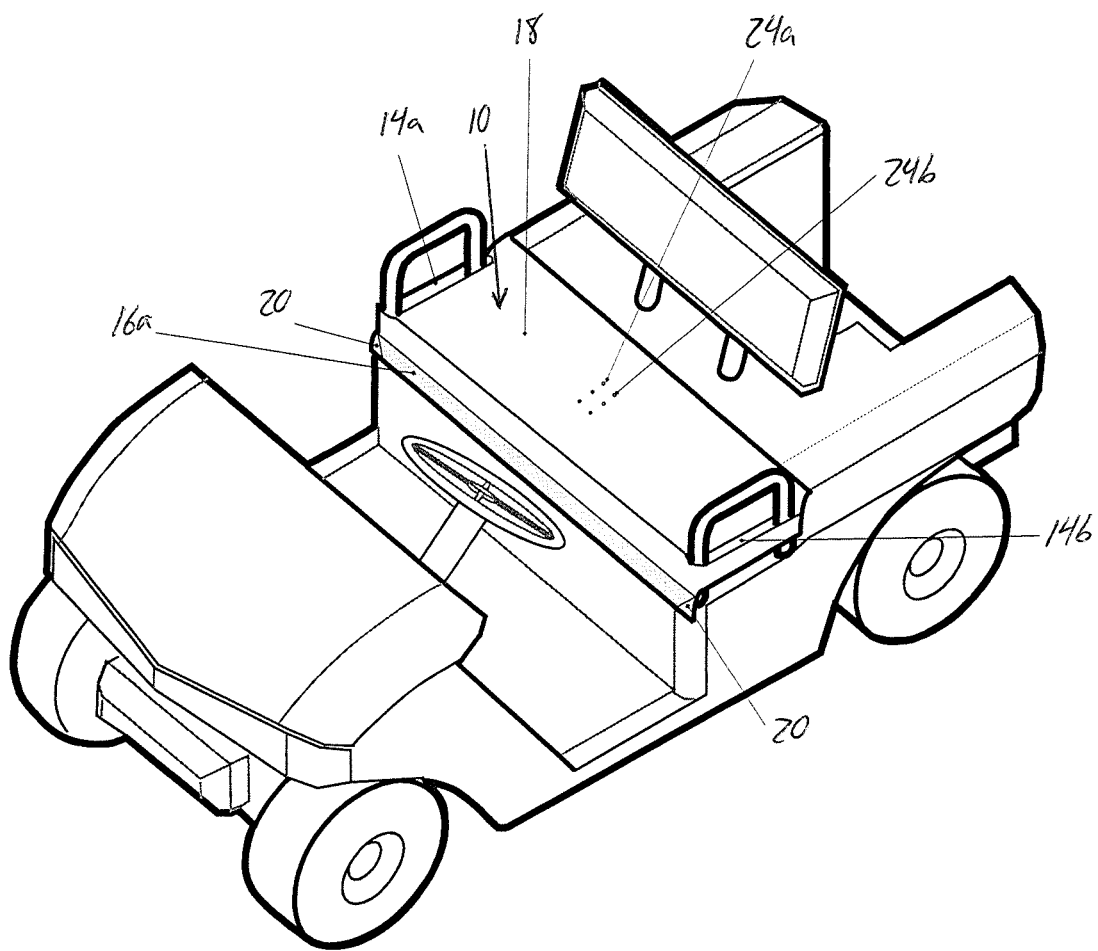
FIG. 3 is a perspective view of the golf cart of FIG. 2 after placement of the seat cover thereon.

With reference to FIGS. 2 and 3, the seat cover 10 is first installed on the seat 102 of the golf cart 100 by lowering the seat cover overtop of the golf cart seat 102, which may involve slipping the slots 14a, 14b over the handles 104 of the golf cart 100 if the seat cover is provided with such handle slots near the ends thereof. The rear strip 16b of the seat cover is tucked behind, and optionally under the golf cart seat 102, and the front strip 16a of the seat cover overhangs the front of the golf cart seat to drape downwardly therefrom. In this installed position of the seat cover, each half thereof covers a respective half of the two-occupant bench-style golf cart seat 102, and the two subsets 24a, 24b of fastener elements on the topside of the seat cover 10 reside atop the golf cart seat 102 at a central area thereof that resides between the two passengers of the golf cart when the seat 102 is occupied.

Figure 4:
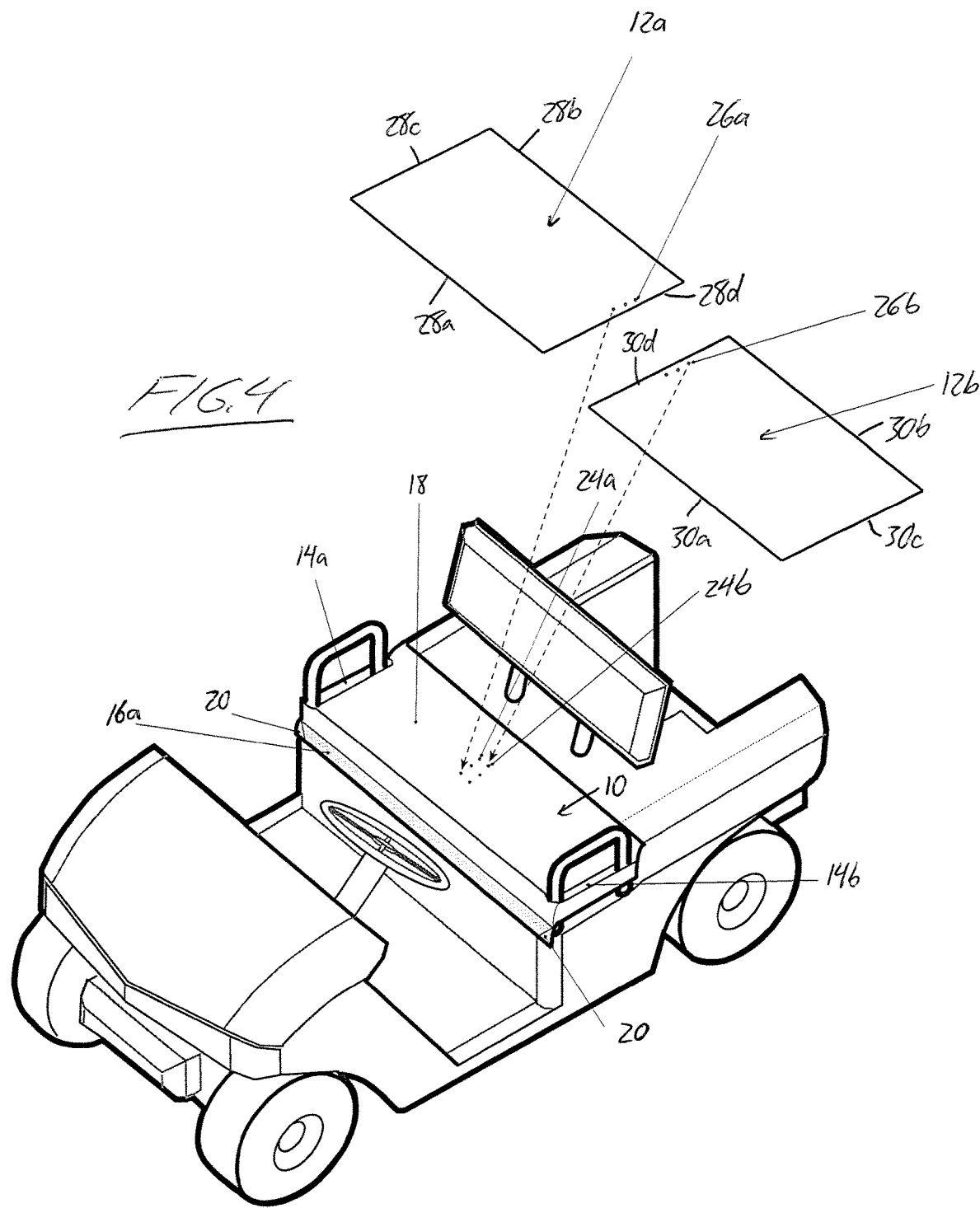
FIG. 4 is a perspective view illustrating attachment of the lap blankets of FIG. 1 to the previously placed seat cover of FIG. 3.

Turning to FIG. 4, should either passenger of the golf cart wish to have a blanket available to them for warmth and/or comfort, for example depending on variable weather conditions, a respective one of the two blankets 12a, 12b is detachably fastened to the installed seat cover 10 by mating of the respective second or third set of fastener elements 26a, 26b on the blanket with the respective subset of fastener elements 24a, 24b on that passenger's respective half of the seat cover. The mated fastener elements hold the blanket to the seat cover, which in turn is secured to the golf cart seat. The blanket thus is thus secured to the golf cart seat, and will not blow away, or fall from cart onto the ground as the passenger boards and departs the golf cart between golf shots. At the same time, access to and from the cover of the blanket is quick and convenient, as the blanket is attached to the golf cart only at the inner edge of the blanket near the widthwise center of the golf cart. The front, rear and outer edges of the blanket remain freely movable relative to the seat cover 10 and underlying seat 102, whereby the passenger can easily lift up the blanket by any of these free edges to slip their lap into and out of the confines of the blanket as they board the golf cart each time. Meanwhile, should either passenger of the cart not require a blanket, their blanket can be stored separately of the seat 102 in a detached state from the seat cover, for example in a storage compartment or golf bag elsewhere on the cart 100. The seat cover can be left in place for all users, regardless of blanket use, thus providing an easy way to equip the cart for selective blanket-attachment without factory incorporation or aftermarket installation of fastener elements directly to the seat upholstery. This way, the cover and attached fastener elements can be removed at any time, for example for washing or repair, or for hotter summer conditions in which blanket use is not expected.

While the forgoing embodiment is presented in the context of a multi-blanket system for a multi-occupant bench-like seat on a golf cart, it will be appreciated that similar application of a smaller seat cover with a single attachable/detachable blanket may be used a single-occupant seat. Additionally, though the forgoing embodiment features fastener elements mounted on a fabric seat cover for indirect support on the seat over which the cover is installed, mounting of the first set of fastener elements directly to the seat itself is also contemplated. While the illustrated embodiment employs multiple fasteners laid out in a row on each blanket and each half of the seat cover, as few as one fastener at each of these fastening locations may be sufficient. Also, while the first illustrated embodiment focuses on a golf cart, use on other vehicles is also contemplated, whether on other open-air vehicles where the passengers are exposed to the surrounding environment, or vehicles with enclosed passenger cabins. Additionally, the lap blanket system is not limited to vehicular applications, and may be used in stationary seating contexts, including both indoor and outdoor venues, such as stadiums, arenas, theatres, tents, music halls, churches, etc.

FIG. 5 shows a portable seat and blanket system according to a second embodiment, which is particularly useful in scenarios where no padded seating surfaces are readily available. The system once again features first and second blankets 12a, 12b of the same type described above for the golf cart embodiment, but the first and second subsets 24a, 24b of fastener elements are mounted on respective detachable halves of a cushioned portable seat 50 rather than on respective halves of a non-cushioned fabric seat cover used on an already-padded golf cart seat. When attached together, the two halves 50a, 50b of the portable seat 50 are symmetrically mirrored across a mid-plane 22 that resides centrally between ends of the portable seat, just like the two halves of the first embodiment's seat cover.

Each half 50a, 50b of the portable seat 50 features a fabric shell 48 inside of which compressible materials (e.g. resiliently compressible foam) is contained. The shells may be made of, or externally lined with, wool, fleece or other thermally insulative material. When assembled, the overall seat 10' is of elongated rectangular shape like that of the seat cover of the first embodiment. Each rectangular half of the overall seat has a front edge 52a, a rear edge 52b, an outer edge 52c and an inner edge 52d. The inner edges 52d of the two halves resides adjacent one another, while the outer edges lie opposite one another to define the opposing ends of the portable seat 50 between which the mid-plane 22 is centered in the widthwise direction. The inner edges 52d of the two halves feature mating zipper teeth in order to cooperably define a zipper 54 that is located at the mid-plane 22. Using this zipper 54, the two halves are selectively attachable and detachable to and from one another. A respective handle loop 56 is attached to each half 50a, 50b of the portable seat 50 at or near the outer edge 52c thereof so that the handle loop 56 reaches outwardly beyond the outer edge 52c.

The row of fastener elements in each subset 24a, 24b on the portable seat 50 resides near and parallel to the zipper 54 at the mid-plane of the seat, and the two blankets 12a, 12b are selectively attachable to the respective halves 50a, 50b of the portable cushion in the same manner that the blankets attach to the seat cover in the first embodiment. In a known manner, the zipper teeth are attached to the shells of the seat halves by respective flaps of fabric, whereby when the halves of the seat are attached together by the zipper 54, they are also pivotal relative to one another about the axis of the zipper due to flexibility in these zipper attachment flaps. About this pivot axis, the halves of the seat can be folded together into face-to-face relation to one another, thus bringing together the two outer edges 52c of the seat and the two handle loops 56 supported at these outer edges. This reduces the footprint of the portable seat into a compact form for efficient transport and store, while the handle loops provide convenient and comfortable carrying of the folded unit in one hand.

The seat and the selectively attachable/detachable blankets can be used in two different modes: a shared multi-occupant mode, or a divided individual mode. In the shared multi-occupant mode, the two halves 50a, 50b of the seat are left zipped together, and are unfolded away from one another so as to lie in coplanar side-by-side relation, as shown in FIG. 5, rather than in adjacent face-to-face relation like in the folded-up transport position. The zipped-together coplanar halves are laid down atop a bench, ground area or other generally horizontal surface capable of supporting multiple occupants, and two users each then sit atop a respective half of the assembled portable seat. Each user has the option of whether to attach the respective blanket to their half of the multi-occupant portable seat. In the divided individual mode, the zipper 54 is undone in order to separate the two halves of the portable seat from one another for use of each as an individual seat by a respective user. This is useful in contexts where a large enough surface for seating of multiple users side-by-side is unavailable (e.g. stadiums, arenas or other venues with individual seating, as opposed to bench seating), or where the two individuals attending an event and intending to share the same portable seat 50 are unable to obtain seating spaces directly beside one another.

In addition to the heat retaining, wind-shielding function of the blanket to help protect a user against cold environmental conditions, the portable seat may additionally incorporate other cold-combatting features, for example incorporating one or more heating elements into its construction. While the illustrated embodiment uses a zipper to attach and detach to the halves of the portable seat to and from one another, other embodiments may employ other fastener types, for example the same or similar snap fasteners as those used to selectively attach and detach the blankets, or hook and look fasteners. In any case, elements of matable type are mounted on the two sections at their inner edges thereof (e.g. mating zipper teeth, mating male and female snap components, mating pieces of hook and loop fabric, etc.) for cooperation with one another to selective attach the two halves together, with the elements on at least one half preferably mounted on a flexible fabric flap to allow pivotal folding of the two halves relative to one another. The term "attachment elements" is used herein to denote these fastener components by which the halves of the portable seat are attachable to one another, while distinguishing same from the "fastener elements" used to selectively attach the blankets.

While the forgoing embodiment describes a two-user portable seat with two equally sized sections each representing a respective "half" of the portable seat, it will be appreciated that other multi-occupant portable seats may employ a different quantity and/or different relative sizing of multiple zipped-together or otherwise attachable/detachable sections each denoting a respective seating area for a single occupant and each possessing a respective subset of fasteners thereon for optional connection of a respective individual user's blanket. Also, while the illustrated embodiments place the subset of fastening elements near the center of the seat cover or portable seat, which is advantageous in the golf cart embodiment so that the blanket is swung inwardly of the vehicle when lifted off the wearer's lap, it will be appreciated that the fastener elements may alternatively be placed at other areas of a seat cover or portable seat while still gaining other benefits of use.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A lap blanket system for use on an upholstered vehicle seat, said system comprising:
    a removable seat cover defined independently and separately of said upholstered vehicle seat and configured for selective removable placement in laid relation atop a seating surface of said upholstered vehicle seat;
    a first set of one or more fastener elements attached to said removable seat cover; and
    a blanket having a second set of one or more fastener elements thereon, said second set of one or more fastener elements being selectively matable with at least one of said first set of one or more fastener elements, whereby said second set of one or more fastener elements is operable to secure said blanket to said removable seat cover through the first set of one or more fastener elements.

2. The system of claim 1 comprising a second blanket having a third set of one or more fastener elements thereon, wherein said first set of one or more fastener elements comprises a plurality of fastener elements, and said third set of one or more fastener elements is selectively matable with at least one of the plurality of fastener elements in the first set.

3. The system of claim 2 wherein the third set of one or more fastener elements are situated adjacent a perimeter edge of said second blanket.

4. A lap warming method using the system of claim 2, said method comprising laying the removable seat cover in an installed position over the seating surface of an upholstered multi-occupant vehicle seat, and with removable seat cover in the installed position, selectively switching at least one occupant area of said upholstered multi-occupant vehicle seat between a lap-warming configuration and a non-warming configuration by selectively attaching or detaching a respective one of the two blankets in a position overlaying said occupant area of the multi-occupant seat according to the needs of a current or intended occupant of said occupant area.

5. The system of claim 1 wherein the second set of one or more fastener elements are situated adjacent a perimeter edge of said blanket.

6. The system of claim 1 wherein the first set of one or more fastener elements reside on a topside of removable seat cover at positions thereon that overlie the seating surface of the upholstered vehicle seat when said removable seat cover is laid thereover.

7. The system of claim 6 wherein said first set of one or more fastener element are spaced inwardly from a perimeter of said seat cover in a width direction thereof that lies laterally of the upholstered vehicle seat when laid atop said seating surface.

8. The system of claim 7 wherein said first set of one or more fastener elements are situated nearer to a center of said seat cover in the width direction thereof than to ends of said seat cover that are situated oppositely of one another in said width direction.

9. The system of claim 8 wherein said first set of one or more fastener elements comprises first and second subsets of fastener elements situated on opposing sides of a mid-plane that bisects the seat cover at the center thereof.

10. The system of claim 1 wherein said first set of one or more fastener elements comprises at least one row of fastener elements in which said fastener elements are spaced from one another in a depth direction of said seat cover that lies in a front-to-rear depth direction of said upholstered vehicle seat when laid atop said seating surface.

11. The system of claim 10 wherein said at least one row of fastener elements comprises two rows of fastener elements.

12. The system of claim 1 in combination with said upholstered vehicle seat, wherein said removable seat cover is in said laid relation atop the seating surface of said upholstered vehicle seat, and the first set of one or more fastener elements on said removable seat cover reside overtop said seating surface.

13. A lap blanket system comprising:
    a portable seat;
    a first set of one or more fastener elements attached to said portable seat; and
    a blanket having a second set of one or more fastener elements thereon, said second set of one or more fastener elements being selectively matable with at least one of said first set of one or more fastener elements, whereby said second set of one or more fastener elements is operable to secure said blanket to said removable seat cover through the first set of one or more fastener elements.

14. The system of claim 13 wherein:
    said portable seat is a foldable seat having multiple sections pivotally connected together for relative movement thereof between a folded transport position placing the sections in face-to-face relation to one another, and an unfolded use position placing the sections in coplanar relation to one another; and
    and the first set of one or more fastener elements comprises at least one fastener element on each of the sections.

15. The system of claim 14 wherein the portable seat comprises separable sections, and the first set of one or more fastener elements comprises at least one fastener element on each of the sections.

16. The system of claim 13 wherein:
    the portable seat is a two-person portable seat having two separable halves that are divided from one another at a mid-plane and are selectively attachable and detachable to and from one another at said mid-plane; and said first set of one or more fastener elements comprise a first and second subsets of fastener elements situated on opposing sides of the mid-plane.

17. A lap warming method using the system of claim 1, said method comprising laying the removable seat cover in an installed position over the seating surface of the upholstered vehicle seat, and with removable seat cover in the installed position, selectively switching the seat between a lap-warming configuration with the blanket fastened to the removable seat cover and a non-warming configuration with the blanket detached from said removable seat cover according to warming needs of a current or intended seat occupant.

18. The system of claim 1 in combination with a golf cart embodying said upholstered vehicle seat.

19. The combination of claim 18 wherein removable seat cover is in said laid relation atop the seating surface of said upholstered vehicle seat of the golf cart.

20. The combination of claim 19 wherein the first set of one or more fastener elements on said removable seat cover reside overtop said seating surface.

* * * * *